Jan. 27, 1970  H. HASSELMANN  3,491,505
APPARATUS AND METHOD FOR FILLING SEALING AND
PALLETIZING CONTAINERS
Filed Jan. 23, 1967  3 Sheets-Sheet 1

Inventor
HEINRICH HASSELMANN

BY
*McGlew & Toren*
ATTORNEYS

Jan. 27, 1970  H. HASSELMANN  3,491,505
APPARATUS AND METHOD FOR FILLING SEALING AND
PALLETIZING CONTAINERS
Filed Jan. 23, 1967  3 Sheets-Sheet 2
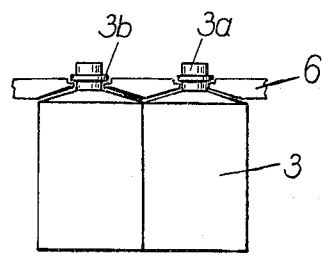
Fig.2
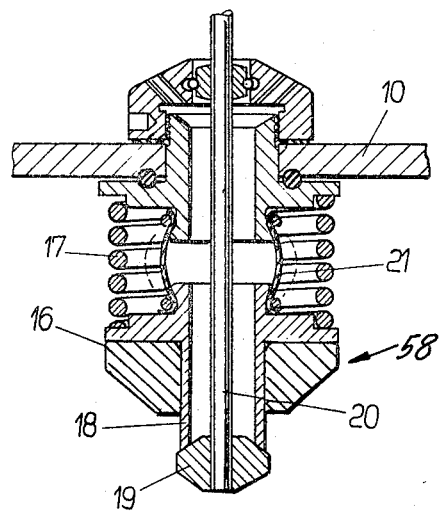
Fig.4
Fig.3
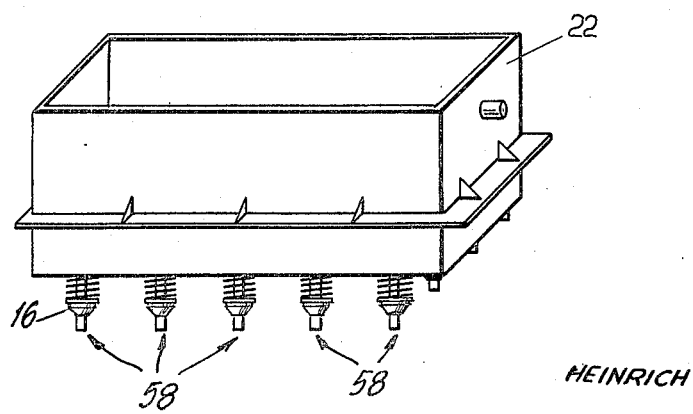
Inventor
HEINRICH HASSELMANN
BY
McGlew & Toren
ATTORNEYS United States Patent Office 3,491,505
Patented Jan. 27, 1970

3,491,505
APPARATUS AND METHOD FOR FILLING SEALING AND PALLETIZING CONTAINERS
Heinrich Hasselmann, 101 Bergstrasse, 58 Hagen in Westfalen, Germany
Filed Jan. 23, 1967, Ser. No. 611,065
Claims priority, application Germany, Jan. 27, 1966, H 58,366
Int. Cl. B67c 3/24, 7/00; B67b 3/20
U.S. Cl. 53—26                           7 Claims

ABSTRACT OF THE DISCLOSURE

A method and apparatus are disclosed for filling and loading containers. In accordance with the inventive procedures, the containers which are of generally block-shaped configuration are arranged together in horizontal groupings of block-shaped configuration and they are held together in a group by bands which encircle the exterior walls of all of the containers having an exterior wall exposed in the group. The resultant block-shaped unit is then handled as a unit in order to effect the filling and sealing of each container, and thereafter the stacking of the container units on pallets for shipping.

SUMMARY OF THE INVENTION

The present invention relates in general to a method and apparatus for filling, sealing and palletizing containers such as bottles, and in particular to a new and useful apparatus and method for moving containers which are connected together in a horizontal block-shaped group into association with filling and sealing apparatus and for thereafter transporting the block-shaped group onto a pallet for shipment.

In order to produce bottles and other hollow bodies economically, they must be lightweight and they therefore must be thin-walled. If plastic material is employed, the bottles can be compressed relatively easily. Therefore, they cannot be filled, sealed and palletized with the conventional machines for glass bottles. If thin-walled bottles of plastic material are pressed during the filling and sealing process by plungers engaging the bottom of the bottles and acting in a vertical direction against the filling and sealing head, the bottles are seized at the collar of the thick neck and the bottle openings are pullled toward the filler cap and toward the sealing head. In order to achieve a high filling output, the bottles are fed at high speed individually in succession to the machine and tools with high filling outputs. All parts must move rapidly and frequently and are therefore subject to relatively rapid wear. This results in high maintenance expenditures. Known machines are complicated, require much space and are expensive.

In accordance with the present invention, thin-walled and correspondingly sensitive bottles are combined together in horizontal units or bundles by means of encircling bands or clamping devices and the whole block-shaped bundle of a plurality of such containers is introduced with a lifting device into association with an apparatus for filling, capping and sealing the containers. The lifting device advantageously includes spaced lifting bars arranged so that the containers may be fed under the bars with the necks thereof projecting upwardly between adjacent bars. The container necks are advantageously provided with flanges so that the bars will engage the flange when they are lifted in order to lift the whole bundle of containers. In this manner all of the containers of a bundle are simultaneously lifted and presented to a filling apparatus which includes a separate discharge or filling spout for each container and which engages into the filling neck thereof. After filling the complete bundle with all of the containers it is then moved to the next station in which they are capped and sealed, and thereafter they are transported onto a pallet or simiar device for storage or shipment.

In the preferred form one or more conveyors are arranged to feed groups of containers into handling apparatus which include spaced pickup bars which engage around each side of the container necks after the conveyor presents the container bundle in an operative position in respect to the apparatus. The mechanism advantageously includes means for first lifting the bundle from the moving conveyor and for then transporting the bundle in succession through operative stages to fill, seal and store the containers.

Accordingly it is an object of the present invention to provide a method of handling containers for their filling and sealing using containers which have neck portions which extend upwardly from the top of the containers and which have flanges surrounding the neck portion, comprising arranging the containers in groups composed of a plurality of rows of such containers having their neck portions aligned in each row, clamping the containers in the group arrangement, arranging lifting bars between adjacent rows of containers and lifting the bars to cause them to engage beneath the flanges of the necks of the containers on each side of the row and to move the whole group of containers to present each neck into association with a filling mechanism, and thereafter removing the containers from the filling mechanism and presenting them to mechanism for capping them.

A further object of the invention is to provide an apparatus for filling containers which includes means for feeding horizontal groups of such containers in a combined bundle along a defined feed path, a plurality of spaced pick-up members disposed in the feed path in spaced relationship so that the containers are fed along the feed path in a manner such that their neck portions extend between the pick-up members, and means for raising the pick-up members to present the groups of containers into association with filling mechanism.

A further object of the invention is to provide a device for handling groups of containers for filling, capping and storing, which includes a frame having pick-up members thereon which are disposed for vertical movement below filling and capping mechanism and which may be moved horizontally, for example, for transferring the groups of containers into association with filling, capping and thereafter storing devices.

A further object of the invention is to provide an apparatus for simultaneously filling groups of containers which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 is a partial enlarged elevational view showing the manner in which the neck portions of the container are fed between the lifting bars;

FIG. 3 is a perspective view of a filling tank which may be used in association with the lifting device of FIG. 1;

FIG. 4 is an enlarged sectional view of a filling element of the filling device indicated in FIG. 3;

DETAILED DESCRIPTION

Figure 1:
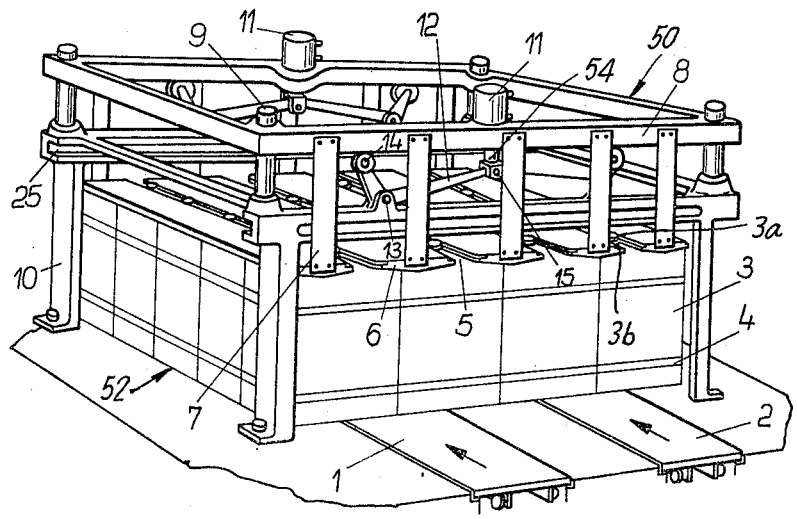
FIG. 1 is a front perspective view of a container lifting device constructed in accordance with the invention.

Referring to the drawings in particular, the invention as embodied therein as indicated in FIGS. 1 and 2 comprises a conveyor which includes endless belts 1 and 2 which is disposed alongside a bottle bundle lifting or handling device generally designated 50 for handling horizontal groupings of containers or bottles referred to herein as bundles or units generally designated 52. In accordance with the invention each bundle 52 includes a plurality of block-shaped containers 3 which are arranged together in a convenient to handle block shape as for example with twenty bottles or containers 3 as shown in FIG. 1. The containers 3 are made with flat sides so that they can be oriented in juxtaposition in a manner such that neck portions 3a of containers of one row will be aligned in rows extending in the direction of advance along the conveyors 1 and 2 upon which they are positioned. Each neck portion 3a includes a flange 3b. The bottles are secured together in a bundle 52 by bands or tapes 4, and when they are fed by the conveyor 1 or 2, the neck portions will move between rails or pick-up members 6 into spaces 5 defined therebetween. The rails or pick-up members 6 are flat members which include edges which extend outwardly to engage below the flange portion 3b of each container. When the bars 6 are lifted, they also cause a lifting of the complete bundle 52 of containers.

When the bundle 52 is advanced by the conveyors 1 and 2 into the handling apparatus 50, it strikes against an end stop (not shown) which prevents further movement of the conveyors and which at the same time actuates lifting means 11 for lifting the lifting bar 6. Each lifting bar is secured to a holding iron 7 arranged at each end which in turn is carried on a lifting frame 8. The lifting frame 8 may move upwardly and downwardly on corner column 9 which are carried on a lower frame 10. The movement in accordance with the embodiment illustrated is effected by actuation of the lifting means which comprises a fluid-operated cylinder 11 having a plunger 54 which is pivotally connected through a pivot pin 15 to a crank arm member 12. The crank arm member is pivoted at 13 on the frame 10 and it includes an arm portion which terminates in a roller which bears against the lifting frame 8. The downward movement of the plunger 54 causes the upward movement of the roller 14 and the raising of the frame 8. This causes the engagement of the bottle necks 3a at their flange or collar 3b by the lifting bars 6.

In accordance with a feature of the invention, the frame 10 is provided with a guide rail 25 which supports a flange 56 of a fluid tank 22 (FIG. 3) which may be supported on the rail 25 above the frame 10. The fluid tank 22 carries a plurality of discharge nozzles 58 which are spaced in the same manner as the necks 3a of the containers of the bundle 52 therebelow. When the container bundle 52 is raised, the necks of each of the bottles engage against a conical formation 16 of each nozzle 58 (FIGS. 3 and 4). This causes the upward movement of the column 16 and the compression of a spring 17 to cause a filling pipe 18 to become lifted upwardly away from a cone element or stopper 19 so that liquid can flow through the pipe 18 into the container 3. The air can escape from the container being filled through a pipe 20. An elastic connection between the moving parts 16 and 18 and the stationary part 10 is insured by an elastic hose or bellows 21. The spring 17 and the bellows 21 permit a certain adaptability to unavoidable deviations in vertical and lateral movements and the heights of the containers.

Figure 5:
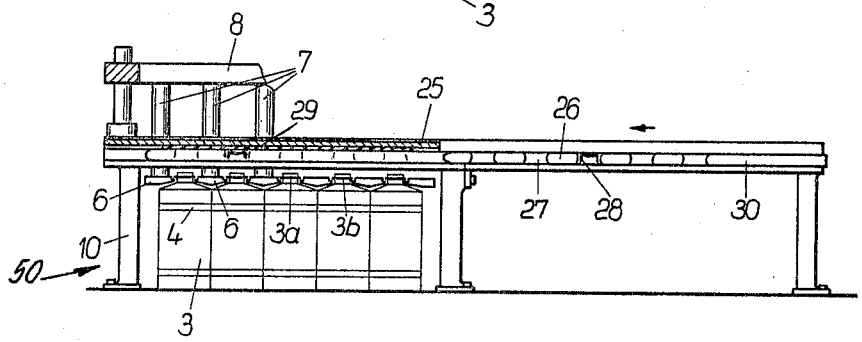
FIG. 5 is a side elevational view of the lifting device indicated in FIG. 1 with a sealing device for crown caps incorporated thereon.

In the event that the containers are to be sealed after they are filled, a container cap applying device or frame 30 is moved into association with the frame 10, as indicated in FIG. 5. The liquid tank 22 is removed and it is replaced by the frame 30 which acts as a carrier for the seals or caps to be used for sealing the container. A slide 26 for the movement of the caps 28 is provided with apertures for accommodating each cap in such a way that they are held by friction or mild clamping pressure and may be aligned over the respective container necks. It is preferable that the side walls of the aperture 27 be made slightly flexible, for example of rubber, provided with inserted spring tongues. After the crown caps are brought to a position in which they overlie each container neck of the bottle bundle 52, the bundle is again lifted by the lifting frame 8 to cause the container necks 3a to be pressed against the crown caps 28 and against an abutment 29 to cause the seating of the caps on the container necks. In the preferred arrangement, the abutment plate 29 is made of elastic material or is lined with rubber strips or the like. After the crown caps have been firmly applied to the containers, the containers are lowered and replaced on the conveyors 1 and 2 which moves with the bundle 52 away from the handling device 50.

The caps which are fed to the handling device 50 are supplied through a slide formed by a frame element 30.

Figure 6:
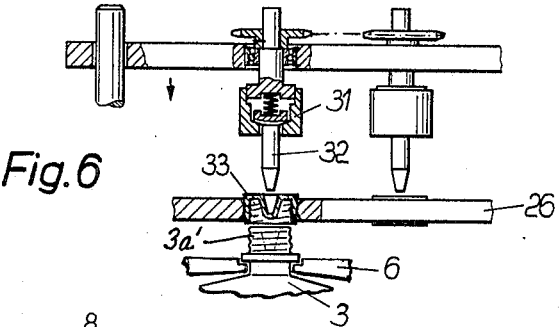
FIG. 6 is a partial view similar to FIG. 5 of another embodiment of the invention.

If the containers are to be provided with screw caps, then of course it is necessary to employ a cap screwing device 31 as indicated in FIG. 6 rather than the pressure applicator for caps as indicated in FIG. 5. The screwing device 31 is arranged above the frame 10 with one rotatable screwing device 31 being provided for each cap. The device advantageously includes a squared tool or mandrel element 32 which engages into a squared recess on the head of the cap 33 for the purpose of rotating this cap element to thread it onto a threaded container neck 3a'.

Figure 7:
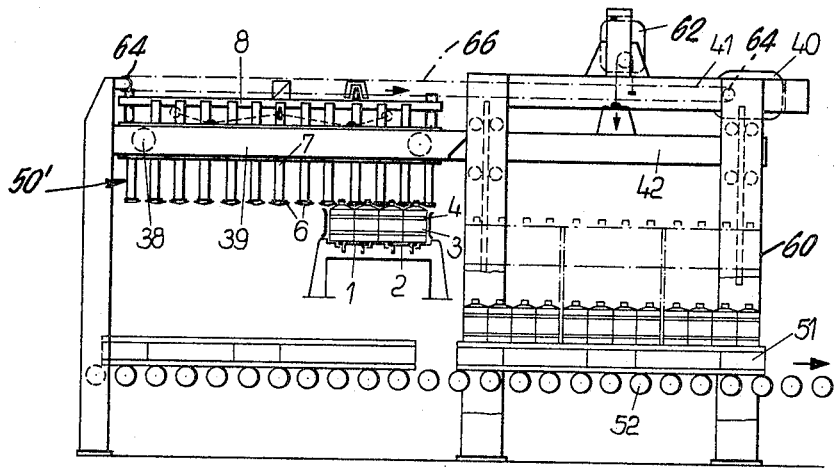
FIG. 7 is a side elevational view of another embodiment of a filling, sealing and palletizing device.
Figure 8:
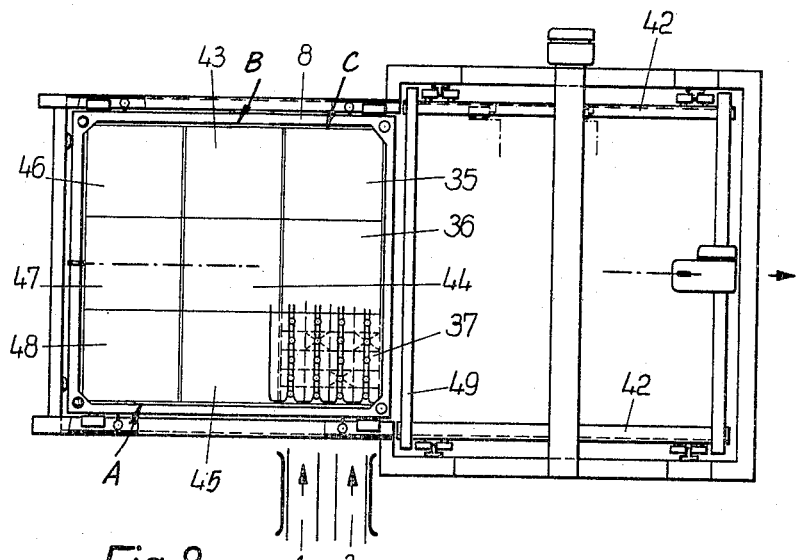
FIG. 8 is a top plan view of the apparatus indicated in FIG. 7.

FIGS. 7 and 8 indicate a somewhat modified device which includes means for transporting three separate groups of containers into association with the handling device for each stage of operation. For example, the three separate bundles 35 to 37, 43 to 45 and 46 to 48 of each of three handling stages A, B and C indicated in FIG. 8 may be lifted off one or a plurality of sets of conveyors 1 and 2 and may be shifted laterally to pass each stage through separate filling, capping and sealing stations. After they have been filled and sealed, they are moved to a track or platform 42 and lowered downwardly onto a pallet 51 which is mounted on a roller conveyor so that it may be moved away from the device for either storage or shipment of the containers. While one stage of the operation is taking place, a second plurality of bundles can be brought to the positions indicated 43, 44 and 45, and after this is done, the associated conveyor is stopped until the container is raised for example to the device for effecting the applying of a sealing cap thereto. While this is done, containers which are delivered to panels 46, 47 and 48 may be moved into association with filling mechanism. In this manner, the three stages of operation may be carried out either concurrently or simultaneously. Of course, instead of transporting the containers laterally after they have been filled and sealed, they may be transported along the same path as the path of feed to the handling device. The device advantageously includes a lifting platform consisting of the platform parts 42 and 49 which are vertically movable in a frame 60 under the control of a motor 62. The pallet 51 can be moved upwardly on the platform 42 if desired. A motor 40 is connected to the handling device 50' through chains and sprockets 64 and 66 to shift it laterally.

The use of identical units for engagement and lifting of bottles of an entire bundle has the advantage that the storage of the spare parts for the individual units required is simplified and additional elements are always available for operation. The bottles are greatly protected by the proposed handling, filling and sealing mechanism and by their bundle arrangement. They can be made of thin-walled construction and only the bottle neck with its collar need be rigid. The greatest advantage in the use of the device is accomplished when the bundles 52 are made up of a large number of individual containers. However, in special cases it is also possible to process bundles which consist of only a few containers.

While specific embodiments of the invention have been shown and described in detail to illustrate the application of the inventive principles, it will be understood that the invention may be embodied otherwise without departing from such principles.

What is claimed is:

1. An apparatus for filling containers which are arranged together in horizontal groups each consisting of a plurality of rows of containers having a neck portion projecting upwardly therefrom with a flange projecting around said neck portion, the containers of each row having their neck portions in alignment, comprising a lifting frame, a plurality of horizontally disposed and horizontally spaced rail members connected to said lifting frame, means for feeding a group of containers through a path to cause the neck portions to be positioned between adjacent rail members and the flange portions to overlie the rail members, a supporting rail carried by said frame above said rail members and said container groups, a liquid filling tank mounted on said mounting rail, and means for raising said frame with said rail members to lift said container groups into association with said filling means.

2. An apparatus according to claim 1, including a plurality of filling nozzles depending from said tank of a number and arrangement so that a corresponding filling nozzle aligns with each container neck of said group.

3. An apparatus according to claim 2, wherein said filling nozzles each include a discharge conduit, an air pipe extending through said discharge conduit and having an end stopper portion closing the lower end of said discharge pipe, means biasing said discharge pipe to engage said stopper portion with said discharge pipe to close said pipe, said containers being adapted to engage around said discharge pipe and to displace said discharge pipe away from said stopper portion to open said pipe to permit discharge of the liquid from said tank.

4. An apparatus for filling containers which are arranged together in horizontal groups each consisting of a plurality of rows of containers having a neck portion projecting upwardly therefrom with a flange projecting around said neck portion, the containers of each row having their neck portions in alignment, comprising a lifting frame, a plurality of horizontally disposed and horizontally spaced rail members connected to said lifting frame, means for feeding a group of containers through a path to cause the neck portions to be positioned between adjacent rail members and the flange portions to overlie the rail members, filling means carried by said frame above said rail members and said container groups, and means for raising said frame with said rail members to lift said container groups into association with said filling means, means for feeding cap elements into a position on said frame overlying a respective neck each of said containers of said group, and resilient means engaging over the top of said cap elements, said container neck portions being adapted to engage into respective cap elements and to press said cap elements against said resilient means as the cap is seated on the neck of said container when said group of containers is lifted by said lifting means, said filling means being removable from said frame to permit insertion of said cap supplying means.

5. An apparatus for filling containers which are arranged together in horizontal groups each consisting of a plurality of rows of containers having a neck portion projecting upwardly therefrom with a flange projecting around said neck portion, the containers of each row having their neck portions in alignment, comprising a lifting frame, a plurality of horizontally disposed and horizontally spaced rail members connected to said lifting frame, means for feeding a group of containers through a path to cause the neck portions to be positioned between adjacent rail members and the flange portions to overlie the rail members, filling means carried by said frame above said rail members and said container groups, means for raising said frame with said rail members to lift said container groups into association with said filling means, wherein said liquid filling means is removable from said frame, means for delivering cap elements to said frame to overlie a respective neck of each of said containers, and rotatable cap applying means disposed over said frame engageable with said cap to screw the cap onto said container when said frame is raised with said container groups.

6. A method for treating bottles and similar hollow objects, particularly plastic bottles which are provided with a filling tube having a collar or bottle neck at which the bottles are mechanically engaged or supported, said bottles having sidewalls which are engageable so that the filling tubes will be arranged in a predetermined geometric pattern when the bottles are combined as a group, comprising combining the bottles into a unit by moving them together to bring their sides into juxtaposition, applying hands around the sides of the juxtaposed bottles to hold them together into a unit, filling the bottles together simultaneously in the combined unit, closing all of the bottles of the unit together simultaneously, and finally conveying them to a shipping site as a combined unit.

7. A method, according to claim 6, wherein the bottles are fed in a unit to a palletizing device and several units are combined in rows and layers.

References Cited

UNITED STATES PATENTS

| 1,109,075 | 9/1914 | Lange | 53—268 |
| 2,679,347 | 5/1954 | Franz | 141—295 X |
| 2,978,854 | 4/1961 | Fairest | 53—247 |
| 3,270,487 | 9/1966 | Tchimenoglov et al. | 53—282 X |

THERON E. CONDON, Primary Examiner

R. L. SPRUILL, Assistant Examiner

U.S. Cl. X.R.

53—37, 268, 300; 141—172